UNITED STATES PATENT OFFICE.

OTTO KIPPE, OF OSNABRÜCK, GERMANY.

ART OF COMPRESSING FINE ORES AND THE LIKE SUBSTANCES INTO BLOCKS OR BRIQUETS.

1,238,022.      Specification of Letters Patent.      Patented Aug. 21, 1917.

No Drawing.      Application filed January 12, 1917. Serial No. 141,954.

*To all whom it may concern:*

Be it known that I, OTTO KIPPE, subject of the Great Duchy of Mecklenburg-Schwerin, Empire of Germany, residing at Osnabrück, Bohmterstrasse 53, Germany, have invented certain new and useful Improvements in the Art of Compressing Fine Ores and the like Substances into Blocks or Briquets, of which the following is a specification.

My present invention relates to the art of compressing fine ores, and the like substances, into blocks or briquets, by intermixing, in a state of disintegration, with the ores a cementing agent and subjecting the mass to the simultaneous action of steam and pressure.

It is the object of my invention to provide an improved cementing agent capable of being employed in the manufacture of such briquets, and which is inexpensive *per se* and does not reduce the value of the resulting briquets by its presence therein. Such processes as were hitherto employed for the same purpose and providing, for instance, for the addition of lime on the one hand and ground sand, steamed blast furnace slake, or the like material, on the other hand, from which ingredients cementing hydro-silicates of lime were produced by the action of steam applied to the mass, involved the drawback that these said additions were expensive themselves and what is a more serious defect, reduced the value of the resulting briquet; the said additions, indeed, represented a dead charge to the blast furnace.

By my present invention I am able to obviate these defects by employing, as binding agents, calcium hydrate and blast furnace dust which latter substance is a valuable ingredient with regard to the smelting operations within the blast furnace.

Hydrate of lime which is generally acknowledged to be a good flux has been proposed previously as a cementing agent but no satisfactory results could be obtained therewith unless a conversion of the hydrate of lime into calcium carbonate was provided for. Futhermore, the fact has been known that blast furnace dust very frequently contains latent cementing agents which could be stimulated by the addition of salt solutions so as to develop a cementing power of such a degree that good briquets could be manufactured from blast furnace dust by a simple procedure and simultaneously inclose in the thus obtained briquets small quantities of ores. However, considered from a general point, an addition of calcium hydrate ought to be expected not only to reduce the cementing power inherent in the blast furnace dust but even to destroy this cementing property entirely. The so-called gas-filter-dust obtained through the well known dry cleansing operation, was said to act favorably upon lime or other calcareous cementing substances. When pressing heavy blast furnace dust which is of a considerable value for the ore smelting operation, in intermixture with hydrate of lime, into briquets and converting the hydrate of lime into calcium carbonate by subjecting the obtained briquets to the action of the air through a prolonged period of time, or by treating the briquets with gases containing carbonic acid, the blast furnace dust is said to produce a breaking up of the briquet and to prevent a hardening of the same; in consequence thereof, it has been proposed to treat the blast furnace dust with steam under tension, prior to the application of pressure.

Hence, it could not be forecast, as I have discovered, that even considerably heavier sorts of blast furnace dust which on account of the proportion of iron contained therein were of special value for ore smelting operations, such sorts of blast furnace dust, for instance, which separate during the treatment of hematite iron ore in the blast furnace and contain, as a rule, from 20 to 40 per cent. iron, would be prominently useful to act as cementing agents for fine ores in conjunction with hydrate of lime. Through my present invention, I am enabled, for instance, to obtain already really good briquets, with the application of a slight pressure, from a mixture of 84 per cent. of fine-ore-concentrate, 12 per cent. of blast-furnace-dust obtained during the production of hematite pig iron and 4 per cent. of hydrate of lime.

The mixing and pressing operations as well as the step of hardening the briquets under the action of steam supplied under tension are well known, and offer no obstacles, to those acquainted with the art to which my present invention appertains. Whether any sort of blast furnace dust which might be obtainable, is susceptible to my process as described hereinbefore, can be easily ascertained by prior tests.

It is obvious that the hydrate of lime may be prepared from the calcium oxid or burned lime separately, or in mixture with the blast furnace dust and the ore.

What I claim as my invention and desire to secure by Letters Patent of the United States, is:—

1. The herein-described process of forming ore briquets, which consists in mixing fine ores or like fusible substances with hydrate of lime and blast furnace dust; and subjecting the mixture to the action of pressure and steam.

2. The herein-described process of forming ore briquets, which consists in blending ores or like fusible substances, hydrate of lime and blast furnace dust in a disintegrated state; and subjecting the mass thus obtained to the simultaneous action of pressure and steam.

3. The herein-described process of forming ore briquets, which consists in blending ores or like fusible substances, calcium oxid and blast furnace dust in the presence of sufficient water to slake the said calcium oxid; and subjecting the mass thus obtained to the action of pressure and steam.

4. A briquet composed of fine ore or like fusible substance and, as cementing agents, hydrate of lime and blast furnace dust.

5. A briquet composed of fine ore or like fusible substance and, as cementing agents, hydrate of lime and blast furnace dust containing a comparatively large quantity of iron.

6. A briquet composed of fine ore or like fusible substance and, as cementing agents, hydrate of lime and blast furnace dust obtained during the production of hematite pig iron.

7. A briquet composed of a mixture of 84 per cent. of fine-ore-concentrate, 12 per cent. of blast furnace dust, and 4 per cent. of hydrate of lime.

8. A briquet composed of a mixture of 84 per cent. of fine-ore-concentrate, 12 per cent. of blast furnace dust obtained during the production of hematite pig iron, and 4 per cent. of hydrate of lime.

In testimony whereof I have hereunto set my hand in presence of two subscribing witnesses.

DR. PHIL. OTTO KIPPE.

Witnesses:
HENRY HASPER,
ALLEN F. JENNINGS.

Copies of this patent may be obtained for five cents each, by addressing the "Commissioner of Patents, Washington, D. C."